(12) United States Patent
Hu et al.

(10) Patent No.: US 12,262,242 B2
(45) Date of Patent: Mar. 25, 2025

(54) SYSTEMS AND METHODS OF CONFIGURING TRAFFIC SPECIFICATION FOR WIRELESS COMMUNICATION

(71) Applicant: Meta Platforms Technologies, LLC, Menlo Park, CA (US)

(72) Inventors: Chunyu Hu, Saratoga, CA (US); Chittabrata Ghosh, Fremont, CA (US); Muhammad Kumail Haider, Sunnyvale, CA (US)

(73) Assignee: Meta Platforms Technologies, LLC

( * ) Notice: Subject to any disclaimer, the term of this patent is extended or adjusted under 35 U.S.C. 154(b) by 89 days.

(21) Appl. No.: 17/689,612

(22) Filed: Mar. 8, 2022

(65) Prior Publication Data

US 2022/0330081 A1   Oct. 13, 2022

Related U.S. Application Data

(60) Provisional application No. 63/172,331, filed on Apr. 8, 2021.

(51) Int. Cl.
*H04W 28/02* (2009.01)
*H04W 28/12* (2009.01)

(52) U.S. Cl.
CPC ....... *H04W 28/0263* (2013.01); *H04W 28/12* (2013.01)

(58) Field of Classification Search
CPC .......................... H04W 28/0263; H04W 28/12
See application file for complete search history.

(56) References Cited

U.S. PATENT DOCUMENTS

| 2003/0081547 | A1* | 5/2003 | Ho | H04L 47/70 370/338 |
| 2005/0195858 | A1* | 9/2005 | Nishibayashi | H04L 1/1614 370/474 |
| 2005/0238016 | A1* | 10/2005 | Nishibayashi | H04L 47/28 370/389 |
| 2006/0089988 | A1* | 4/2006 | Davie | G06Q 10/10 709/225 |

(Continued)

FOREIGN PATENT DOCUMENTS

| JP | 2005311920 A | * 11/2005 | H04L 1/1614 |
| WO | WO-2003005644 A1 | * 10/2004 | H04L 43/0852 |

(Continued)

OTHER PUBLICATIONS

Duncan Ho (Qualcomm): "TSPEC-lite", IEEE Draft; 11-20-1693-03-00BE-TSPEC-LITE, IEEE-SA Mentor, Piscataway, NJ USA vol. 802.11 EHT; 802.11 be, No. 3 Feb. 2, 2021 (Feb. 2, 2021), pp. 1-12, XP068176133, (Year: 2021).*

(Continued)

*Primary Examiner* — Mehmood B. Khan
(74) *Attorney, Agent, or Firm* — FOLEY & LARDNER LLP

(57) ABSTRACT

Disclosed herein are systems and methods directed to configuring traffic specification for wireless communication. In one aspect, a first wireless communication device may configure a bitmap indicating a plurality of traffic identifiers (TIDs) sharing a traffic specification (TSPEC) element. The first wireless communication device may send a message including the bitmap to a second wireless communication device.

17 Claims, 6 Drawing Sheets

(56) References Cited

U.S. PATENT DOCUMENTS

| | | | |
|---|---|---|---|
| 2011/0141968 A1* | 6/2011 | Trainin | H04L 1/007 |
| | | | 709/227 |
| 2013/0003689 A1* | 1/2013 | Kwon | H04B 7/15557 |
| | | | 370/329 |
| 2016/0219512 A1 | 7/2016 | Asterjadhi et al. | |
| 2018/0092039 A1* | 3/2018 | Cariou | H04W 52/34 |
| 2018/0132175 A1* | 5/2018 | Choi | H04W 72/12 |
| 2019/0261402 A1* | 8/2019 | Asterjadhi | H04W 72/21 |
| 2021/0219186 A1* | 7/2021 | Canpolat | H04W 28/24 |
| 2021/0337594 A1* | 10/2021 | Xin | H04L 47/50 |
| 2021/0352722 A1* | 11/2021 | Xin | H04W 72/56 |
| 2022/0272566 A1* | 8/2022 | Nayak | H04W 28/0268 |
| 2023/0011167 A1* | 1/2023 | Chitrakar | H04W 76/15 |

FOREIGN PATENT DOCUMENTS

| | | | | |
|---|---|---|---|---|
| WO | WO-2019005632 A1 * | 1/2019 | | H04B 7/0617 |
| WO | WO-2022164293 A1 * | 8/2022 | | H04W 76/20 |
| WO | WO-2022223200 A1 * | 10/2022 | | H04W 28/0278 |

OTHER PUBLICATIONS

Ho D., et al., "TSPEC-lite," IEEE Draft, vol. 802.11, No. 3, Feb. 2, 2021, 12 pages, Retrieved from the Internet: URL: https://mentor.ieee.org/802.11/dcn/20/11-20-1693-03-00be-tspec-lite.pptx.

International Search Report and Written Opinion for International Application No. PCT/US2022/024103 mailed Jun. 23, 2022, 9 pages.

* cited by examiner

SYSTEMS AND METHODS OF CONFIGURING TRAFFIC SPECIFICATION FOR WIRELESS COMMUNICATION

CROSS-REFERENCE TO RELATED APPLICATION

This application claims priority to and the benefit of U.S. Provisional Application No. 63/172,331 filed Apr. 8, 2021, entitled "SYSTEMS AND METHODS OF CONFIGURING TRAFFIC SPECIFICATION FOR WIRELESS COMMUNICATION", which is incorporated herein by reference in its entirety for all purposes.

FIELD OF DISCLOSURE

The present disclosure is generally related to communication with certain latency requirements, including but not limited to reducing latency in communication for artificial reality and other applications.

BACKGROUND

Artificial reality such as a virtual reality (VR), an augmented reality (AR), or a mixed reality (MR) provides immersive experience to a user. In one example, a user wearing a head wearable display (HWD) can turn the user's head, and an image of a virtual object corresponding to a location of the HWD and a gaze direction of the user can be displayed on the HWD to allow the user to feel as if the user is moving within a space of artificial reality (e.g., a VR space, an AR space, or a MR space). An image of a virtual object may be generated by a computing device communicatively coupled to the HWD. In some embodiments, the computing device may have access to a network.

In one implementation, an image of a virtual object is generated by a console communicatively coupled to the HWD. In one example, the HWD includes various sensors that detect a location and/or orientation of the HWD, and transmits the detected location and/or orientation of the HWD to the console through a wired connection or a wireless connection. The console can determine a user's view of the space of the artificial reality according to the detected location and/or orientation of the HWD, and generate image data indicating an image of the space of the artificial reality corresponding to the user's view. The console can transmit the image data to the HWD, by which the image of the space of the artificial reality corresponding to the user's view can be presented to the user. In one aspect, the process of detecting the location of the HWD and the gaze direction of the user wearing the HWD, and rendering the image to the user should be performed within a frame time (e.g., less than 11 ms). Any latency between a movement of the user wearing the HWD and an image displayed corresponding to the user movement can cause judder, which may result in motion sickness and can degrade the user experience.

SUMMARY

Disclosed herein are systems and methods related to grouping/bundling traffic identifiers (TIDs) with similar characteristics (e.g., quality of service (QoS)) in a single traffic specification (TSPEC) element. Some embodiments are related to a method of configuring, by a first wireless communication device, a bitmap indicating a plurality of traffic identifiers (TIDs) sharing a traffic specification (TSPEC) element. The method can include sending, by the first wireless communication device to the second wireless communication device, a message including the bitmap.

The message may include a field set to a predefined value to indicate that the bitmap contains valid information. The field being set to the predefined field may cause the second wireless communication device to ignore a traffic stream identifier associated with the TSPEC element. The message may include a direction subfield that may indicate a direction of the plurality of TIDs. The direction subfield may indicate one of: sending traffic in an uplink direction, sending traffic in a downlink direction, sending bidirectional traffic, or sending direct link traffic. The direction subfield may cause the second wireless communication device to ignore the plurality of TIDs when the direction subfield indicates sending direct link traffic, and the direct link traffic is to be sent during a service period of a restricted target wake time. The second wireless communication device may comprise an access point or s station device. The TSPEC element may include characteristics that may be shared by the plurality of TIDs.

Other embodiments are related to a wireless communication device including at least one processor configured to configure a bitmap indicating a plurality of traffic identifiers (TIDs) sharing a traffic specification (TSPEC) element. The wireless communication device may include a transmitter configured to send a message including the bitmap to a second wireless communication device.

The message may include a field set to a predefined value to indicate that the bitmap contains valid information. The field being set to the predefined field may cause the second wireless communication device to ignore a traffic stream identifier associated with the TSPEC element. The message may include a direction subfield that may indicate a direction of the plurality of TIDs. The direction subfield may indicate one of: sending traffic in an uplink direction, sending traffic in a downlink direction, sending bidirectional traffic, or sending direct link traffic. The direction subfield may cause the second wireless communication device to ignore the plurality of TIDs when the direction subfield indicates sending direct link traffic, and the direct link traffic is to be sent during a service period of a restricted target wake time Other embodiments are related to a method of receiving, by a second wireless communication device from a first wireless communication device, a message including a bitmap. The bitmap may indicate a plurality of traffic identifiers (TIDs) sharing a traffic specification (TSPEC) element.

The message may include a field set to a predefined value to indicate that the bitmap contains valid information. The field being set to the predefined field may cause the second wireless communication device to ignore a traffic stream identifier associated with the TSPEC element. The message may include a direction subfield that may indicate a direction of the plurality of TIDs. The direction subfield may indicate one of: sending traffic in an uplink direction, sending traffic in a downlink direction, sending bidirectional traffic, or sending direct link traffic. The direction subfield may cause the second wireless communication device to ignore the plurality of TIDs when the direction subfield indicates sending direct link traffic, and the direct link traffic is to be sent during a service period of a restricted target wake time. The second wireless communication device may comprise a receiver and at least one processor configured to implement the method.

BRIEF DESCRIPTION OF THE DRAWINGS

The accompanying drawings are not intended to be drawn to scale. Like reference numbers and designations in the various drawings indicate like elements. For purposes of clarity, not every component can be labeled in every drawing.

FIG. 1 is a diagram of a system environment including an artificial reality system, according to an example implementation of the present disclosure.

DETAILED DESCRIPTION

Before turning to the figures, which illustrate certain embodiments in detail, it should be understood that the present disclosure is not limited to the details or methodology set forth in the description or illustrated in the figures. It should also be understood that the terminology used herein is for the purpose of description only and should not be regarded as limiting.

Streams of traffic across a network may be characterized by different types of traffic. For instance, an application may be characterized by latency sensitive traffic (e.g., video/voice (VINO), real time interactive applications, and the like) or regular traffic (e.g., best effort/background applications (BE/BK)). Latency sensitive traffic may be identifiable by its characteristic of periodic bursts of traffic. For instance, video display traffic may be driven by the refresh rate of for instance 60 Hz, 72 Hz, 90 Hz, and/or 120 Hz. An application and/or device may have combinations of traffic types (e.g., latency sensitive traffic and non-latency sensitive traffic).

In some implementations, if communication between devices encompasses multiple TIDs, the transmitting device may send as many TSPEC elements as TIDs. That is, a TSPEC element may correspond to a single TID. In an example, given three downlink (DL) TIDs and three uplink (UL) TIDs, then, up to six TSPEC elements may be communicated indicating the characteristics of the DL TIDs and UL TIDs (e.g., three TSPEC elements corresponding to the three DL TIDs and three TSPEC elements corresponding to the three UL TIDs).

However, a number of streams of traffic may share similar/common characteristics. Specifically, streams of traffic generated from a single application (or directed to the application) may share characteristics. For example, an application in the AR/VR context may transmit three TIDs (e.g., one TID identifying audio traffic, one TID identifying video traffic, and one TID identifying traffic related to captured sensor data). However, the three TIDs may share characteristics because they are serving the same application (e.g., the TIDs are identifying latency sensitive traffic). In such cases, it may not be beneficial/efficient to communicate three TSPEC elements corresponding to the three TIDs generated from the application (e.g., with respect to bandwidth and/or power consumed or utilized in communicating the TSPEC elements).

Disclosed herein are related to systems and methods for remotely rendering an artificial reality space (e.g., an AR space, a VR space, or a MR space) by communicating a plurality of TIDs in a single TSPEC element. This is by way of illustration, and in no way intended to limit the solution of describing/managing traffic streams, to artificial reality applications.

Figure 1:
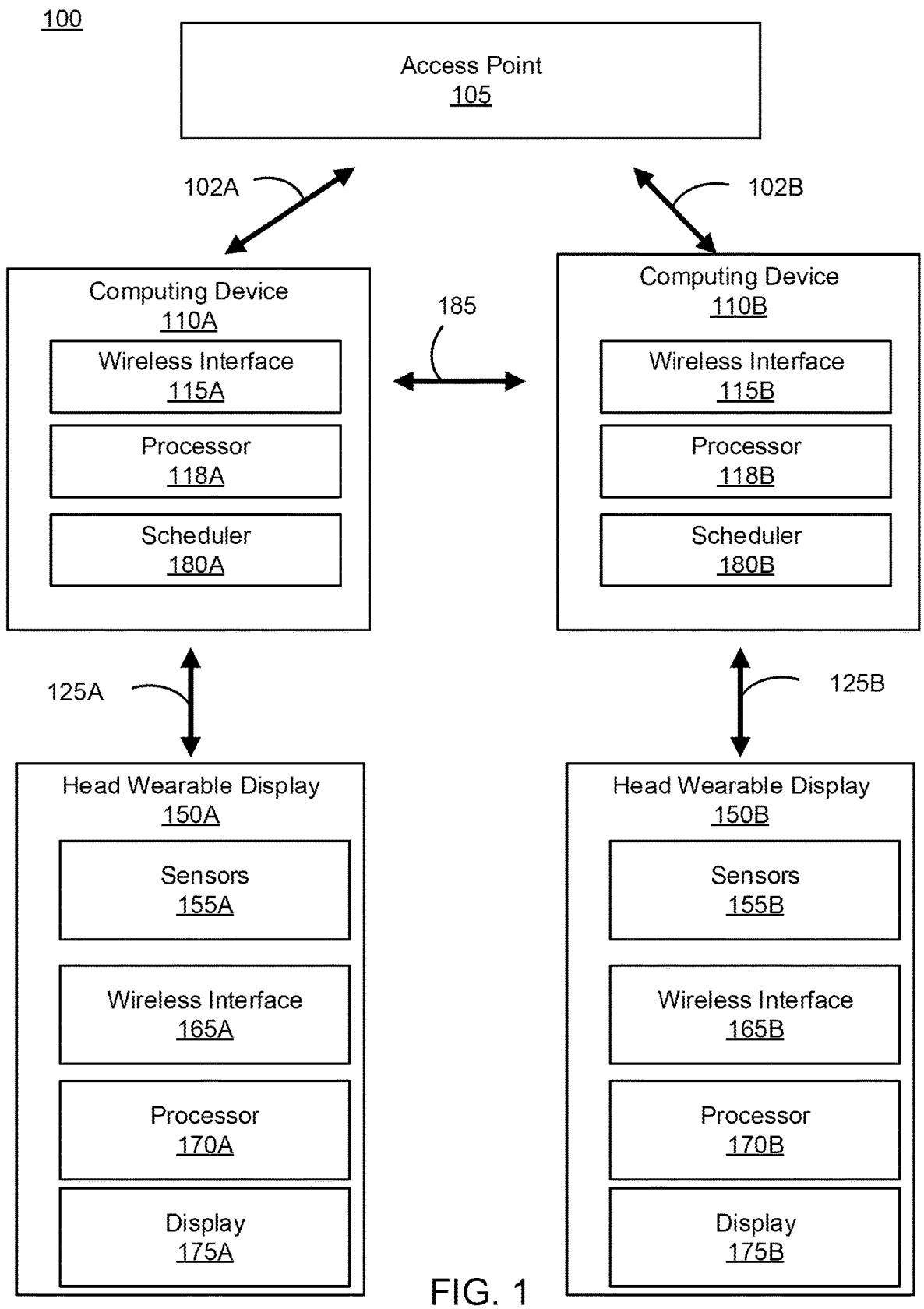

FIG. 1 is a block diagram of an example artificial reality system environment 100. In some embodiments, the artificial reality system environment 100 includes an access point (AP) 105, one or more HWDs 150 (e.g., HWD 150A, 150B), and one or more computing devices 110 (computing devices 110A, 110B) providing data for artificial reality to the one or more HWDs 150. The access point 105 may be a router or any network device allowing one or more computing devices 110 and/or one or more HWDs 150 to access a network (e.g., the Internet). The access point 105 may be replaced by any communication device (cell site). A computing device 110 may be a computing device or a mobile device that can retrieve content from the access point 105, and can provide image data of artificial reality to a corresponding HWD 150. Each HWD 150 may present the image of the artificial reality to a user according to the image data. In some embodiments, the artificial reality system environment 100 includes more, fewer, or different components than shown in FIG. 1. In some embodiments, the computing devices 110A, 110B communicate with the access point 105 through wireless links 102A, 102B (e.g., interlinks), respectively. In some embodiments, the computing device 110A communicates with the HWD 150A through a wireless link 125A (e.g., intralink), and the computing device 110B communicates with the HWD 150B through a wireless link 125B (e.g., intralink). In some embodiments, functionality of one or more components of the artificial reality system environment 100 can be distributed among the components in a different manner than is described here. For example, some of the functionality of the computing device 110 may be performed by the HWD 150. Additionally or alternatively, some of the functionality of the HWD 150 may be performed by the computing device 110.

In some embodiments, the HWD 150 is an electronic component that can be worn by a user and can present or provide an artificial reality experience to the user. The HWD 150 may be referred to as, include, or be part of a head mounted display (HMD), head mounted device (HMD), head wearable device (HWD), head worn display (HWD) or head worn device (HWD). The HWD 150 may render one or more images, video, audio, or some combination thereof to provide the artificial reality experience to the user. In some embodiments, audio is presented via an external device (e.g., speakers and/or headphones) that receives audio information from the HWD 150, the computing device 110, or both, and presents audio based on the audio information. In some embodiments, the HWD 150 includes sensors 155, a wireless interface 165, a processor 170, and a display 175. These components may operate together to detect a location of the HWD 150 and a gaze direction of the user wearing the HWD 150, and render an image of a view within the artificial reality corresponding to the detected location and/or orientation of the HWD 150. In other embodiments, the HWD 150 includes more, fewer, or different components than shown in FIG. 1.

In some embodiments, the sensors 155 include electronic components or a combination of electronic components and software components that detects a location and an orientation of the HWD 150. Examples of the sensors 155 can include: one or more imaging sensors, one or more accelerometers, one or more gyroscopes, one or more magnetometers, or another suitable type of sensor that detects motion and/or location. For example, one or more accelerometers can measure translational movement (e.g., forward/back, up/down, left/right) and one or more gyroscopes can measure rotational movement (e.g., pitch, yaw, roll). In some embodiments, the sensors 155 detect the translational movement and the rotational movement, and determine an orientation and location of the HWD 150. In one aspect, the sensors 155 can detect the translational movement and the rotational movement with respect to a previous orientation and location of the HWD 150, and determine a new orientation and/or location of the HWD 150 by accumulating or integrating the detected translational movement and/or the rotational movement. Assuming for an example that the HWD 150 is oriented in a direction 25 degrees from a reference direction, in response to detecting that the HWD 150 has rotated 20 degrees, the sensors 155 may determine that the HWD 150 now faces or is oriented in a direction 45 degrees from the reference direction. Assuming for another example that the HWD 150 was located two feet away from a reference point in a first direction, in response to detecting that the HWD 150 has moved three feet in a second direction, the sensors 155 may determine that the HWD 150 is now located at a vector multiplication of the two feet in the first direction and the three feet in the second direction.

In some embodiments, the wireless interface 165 includes an electronic component or a combination of an electronic component and a software component that communicates with the computing device 110. In some embodiments, the wireless interface 165 includes or is embodied as a transceiver for transmitting and receiving data through a wireless medium. The wireless interface 165 may communicate with a wireless interface 115 of a corresponding computing device 110 through a wireless link 125 (e.g., intralink). The wireless interface 165 may also communicate with the access point 105 through a wireless link (e.g., interlink). Examples of the wireless link 125 include a near field communication link, Wi-Fi direct, Bluetooth, or any wireless communication link. Through the wireless link 125, the wireless interface 165 may transmit to the computing device 110 data indicating the determined location and/or orientation of the HWD 150, the determined gaze direction of the user, and/or hand tracking measurement. Moreover, through the wireless link 125, the wireless interface 165 may receive from the computing device 110 image data indicating or corresponding to an image to be rendered.

In some embodiments, the processor 170 includes an electronic component or a combination of an electronic component and a software component that generates one or more images for display, for example, according to a change in view of the space of the artificial reality. In some embodiments, the processor 170 is implemented as one or more graphical processing units (GPUs), one or more central processing unit (CPUs), or a combination of them that can execute instructions to perform various functions described herein. The processor 170 may receive, through the wireless interface 165, image data describing an image of artificial reality to be rendered, and render the image through the display 175. In some embodiments, the image data from the computing device 110 may be encoded, and the processor 170 may decode the image data to render the image. In some embodiments, the processor 170 receives, from the computing device 110 through the wireless interface 165, object information indicating virtual objects in the artificial reality space and depth information indicating depth (or distances from the HWD 150) of the virtual objects. In one aspect, according to the image of the artificial reality, object information, depth information from the computing device 110, and/or updated sensor measurements from the sensors 155, the processor 170 may perform shading, reprojection, and/or blending to update the image of the artificial reality to correspond to the updated location and/or orientation of the HWD 150.

In some embodiments, the display 175 is an electronic component that displays an image. The display 175 may, for example, be a liquid crystal display or an organic light emitting diode display. The display 175 may be a transparent display that allows the user to see through. In some embodiments, when the HWD 150 is worn by a user, the display 175 is located proximate (e.g., less than 3 inches) to the user's eyes. In one aspect, the display 175 emits or projects light towards the user's eyes according to image generated by the processor 170. The HWD 150 may include a lens that allows the user to see the display 175 in a close proximity.

In some embodiments, the processor 170 performs compensation to compensate for any distortions or aberrations. In one aspect, the lens introduces optical aberrations such as a chromatic aberration, a pin-cushion distortion, barrel distortion, etc. The processor 170 may determine a compensation (e.g., predistortion) to apply to the image to be rendered to compensate for the distortions caused by the lens, and apply the determined compensation to the image from the processor 170. The processor 170 may provide the predistorted image to the display 175.

In some embodiments, the computing device 110 is an electronic component or a combination of an electronic component and a software component that provides content to be rendered to the HWD 150. The computing device 110 may be embodied as a mobile device (e.g., smart phone, tablet PC, laptop, etc.). The computing device 110 may operate as a soft access point. In one aspect, the computing device 110 includes a wireless interface 115 and a processor 118. These components may operate together to determine a view (e.g., a field of view of the user) of the artificial reality corresponding to the location of the HWD 150 and the gaze direction of the user of the HWD 150, and can generate image data indicating an image of the artificial reality corresponding to the determined view. The computing device 110 may also communicate with the access point 105, and may obtain AR/VR content from the access point 105, for example, through the wireless link 102 (e.g., interlink). The computing device 110 may receive sensor measurement indicating location and the gaze direction of the user of the HWD 150 and provide the image data to the HWD 150 for presentation of the artificial reality, for example, through the wireless link 125 (e.g., intralink). In other embodiments, the computing device 110 includes more, fewer, or different components than shown in FIG. 1.

In some embodiments, the wireless interface 115 is an electronic component or a combination of an electronic component and a software component that communicates with the HWD 150, the access point 105, other computing device 110, or any combination of them. In some embodiments, the wireless interface 115 includes or is embodied as a transceiver for transmitting and receiving data through a wireless medium. The wireless interface 115 may be a counterpart component to the wireless interface 165 to communicate with the HWD 150 through a wireless link 125 (e.g., intralink). The wireless interface 115 may also include a component to communicate with the access point 105 through a wireless link 102 (e.g., interlink). Examples of wireless link 102 include a cellular communication link, a near field communication link, Wi-Fi, Bluetooth, 60 GHz wireless link, or any wireless communication link. The wireless interface 115 may also include a component to communicate with a different computing device 110 through a wireless link 185. Examples of the wireless link 185 include a near field communication link, Wi-Fi direct, Bluetooth, or any wireless communication link. Through the wireless link 102 (e.g., interlink), the wireless interface 115 may obtain AR/VR content, or other content from the access point 105. Through the wireless link 125 (e.g., intralink), the wireless interface 115 may receive from the HWD 150 data indicating the determined location and/or orientation of the HWD 150, the determined gaze direction of the user, and/or the hand tracking measurement. Moreover, through the wireless link 125 (e.g., intralink), the wireless interface 115 may transmit to the HWD 150 image data describing an image to be rendered. Through the wireless link 185, the wireless interface 115 may receive or transmit information indicating the wireless link 125 (e.g., channel, timing) between the computing device 110 and the HWD 150. According to the information indicating the wireless link 125, computing devices 110 may coordinate or schedule operations to avoid interference or collisions.

The processor 118 can include or correspond to a component that generates content to be rendered according to the location and/or orientation of the HWD 150. In some embodiments, the processor 118 includes or is embodied as one or more central processing units, graphics processing units, image processors, or any processors for generating images of the artificial reality. In some embodiments, the processor 118 may incorporate the gaze direction of the user of the HWD 150 and a user interaction in the artificial reality to generate the content to be rendered. In one aspect, the processor 118 determines a view of the artificial reality according to the location and/or orientation of the HWD 150. For example, the processor 118 maps the location of the HWD 150 in a physical space to a location within an artificial reality space, and determines a view of the artificial reality space along a direction corresponding to the mapped orientation from the mapped location in the artificial reality space. The processor 118 may generate image data describing an image of the determined view of the artificial reality space, and transmit the image data to the HWD 150 through the wireless interface 115. The processor 118 may encode the image data describing the image, and can transmit the encoded data to the HWD 150. In some embodiments, the processor 118 generates and provides the image data to the HWD 150 periodically (e.g., every 11 ms or 16 ms).

In some embodiments, the processors 118 may configure or cause the wireless interfaces 115 to toggle, transition, cycle or switch between a sleep mode and a wake up mode. In the wake up mode, the processor 118 may enable the wireless interface 115 such that the wireless interfaces 115 may exchange data. In the sleep mode, the processor 118 may disable the wireless interface 115 (e.g., may implement low power or reduced operation) such that the wireless interfaces 115 may not consume power, or may reduce power consumption. The processors 118 may schedule the wireless interfaces 115 to switch between the sleep mode and the wake up mode periodically every frame time (e.g., 11 ms or 16 ms). For example, the wireless interfaces 115 may operate in the wake up mode for 2 ms of the frame time, and the wireless interfaces 115 may operate in the sleep mode for the remainder (e.g., 9 ms) of the frame time. By disabling the wireless interfaces 115 in the sleep mode, power consumption of the computing device 110 and the HWD 150 can be reduced or minimized.

In some embodiments, the processors 118 may configure or cause the wireless interfaces 115 to resume communication based on stored information indicating communication between the computing device 110 and the HWD 150. In the wake up mode, the processors 118 may generate and store information (e.g., channel, timing) of the communication between the computing device 110 and the HWD 150. The processors 118 may schedule the wireless interfaces 115 to enter a subsequent wake up mode according to timing of the previous communication indicated by the stored information. For example, the wireless interfaces 115 may predict/determine when to enter the subsequent wake up mode, according to timing of the previous wake up mode, and can schedule to enter the subsequent wake up mode at the predicted time. After generating and storing the information and scheduling the subsequent wake up mode, the processors 118 may configure or cause the wireless interfaces 115 to enter the sleep mode. When entering the wake up mode, the processors 118 may cause or configure the wireless interfaces 115 to resume communication via the channel or frequency band of the previous communication indicated by the stored information. Accordingly, the wireless interfaces 115 entering the wake up mode from the sleep mode may resume communication, while bypassing a scan procedure to search for available channels and/or performing handshake or authentication. Bypassing the scan procedure allows extension of a duration of the wireless interfaces 115 operating in the sleep mode, such that the computing device 110 and the HWD 150 can reduce power consumption.

In some embodiments, the computing devices 110A, 110B may coordinate operations to reduce collisions or interferences. In one approach, the computing device 110A may transmit a beacon frame periodically to announce/advertise a presence of a wireless link 125A between the computing device 110A and the HWD 150A and can coordinate the communication between the computing device 110A and the HWD 150A. The computing device 110B may monitor for or receive the beacon frame from the computing device 110A, and can schedule communication with the HWD 150B (e.g., using information in the beacon frame, such as an offset value) to avoid collision or interference with communication between the computing device 110A and the HWD 150A. For example, the computing device 110B may schedule the computing device 110B and the HWD 150B to enter a wake up mode, when the computing device 110A and the HWD 150A operate in the sleep mode. For example, the computing device 110B may schedule the computing device 110B and the HWD 150B to enter a sleep up mode, when the computing device 110A and the HWD 150A operate in the wake up mode. Accordingly, multiple computing devices 110 and HWDs 150 in proximity (e.g., within 20 ft) may coexist and operate with reduced interference.

In some embodiments, a scheduler 180 (e.g., scheduler 180A of the computing device 110A and/or scheduler 180B of the computing device 110B) may request/configure/establish TSPEC elements, indicating data rate, bandwidth characteristics, QoS characteristics, and the like of identified traffic streams. The AP 105 and scheduler 180 of the computing devices 110 may negotiate (e.g., perform a handshake process) to establish a membership of a schedule suitable for the traffic identified in the TSPEC element. A STA may establish membership in a schedule by negotiating with the AP. STAs may listen to service period (SP) announcements from the AP and obtain a SP schedule. The STA may provide its own traffic information and/or minimum QoS requirements/other data/traffic characteristics a setup procedure. The AP (and/or peer STA in peer-to-peer (P2P) configuration) may accept/reject/suggest the request (e.g., perform admission control) and may perform resource allocation to update the SP schedule.

The schedulers 180 of the computing devices 110 may schedule communication between the computing device(s) 110 and the HWD(s) 150 with the AP 105 such that the communication between the computing device(s) 110 and HWD(s) 150 is protected/managed. In some embodiments, the computing device(s) 110 may initiate protected P2P communication with the HWD(s) 150 by indicating, to the AP 105, that the computing device(s) 110 wish to schedule P2P communication in particular SP of a schedule. The scheduler 180 of the computing device(s) may schedule (or negotiate) the requested SP(s).

When the AP 105 and the scheduler 118 are negotiating, the AP 105 may be considered a scheduling AP (e.g., AP) and the computing devices 110 may be considered a scheduled STA (e.g., STA). In some embodiments, the HWD 150 may request to send P2P traffic to the computing device 110. Accordingly, the HWD 150 may be considered the requesting STA (e.g., the STA that requests the membership of a schedule), and the computing device 110 may be considered a responding STA (e.g., the STA that responds to the request). In other embodiments, the computing device 110 may request to send P2P traffic to the HWD 150 such that the computing device 110 is considered the requesting STA and the HWD 150 is the responding STA.

The communication link 125 between the computing devices 110 and the HWDs 150 may be a P2P link (e.g., a link used for transmission between two non-AP devices). The communication link 102 between the computing devices 110 and the AP 105 may be any channel or other type of link. In some configurations, the HWD 150 may move/become out of range from the access point 105.

Figure 2:
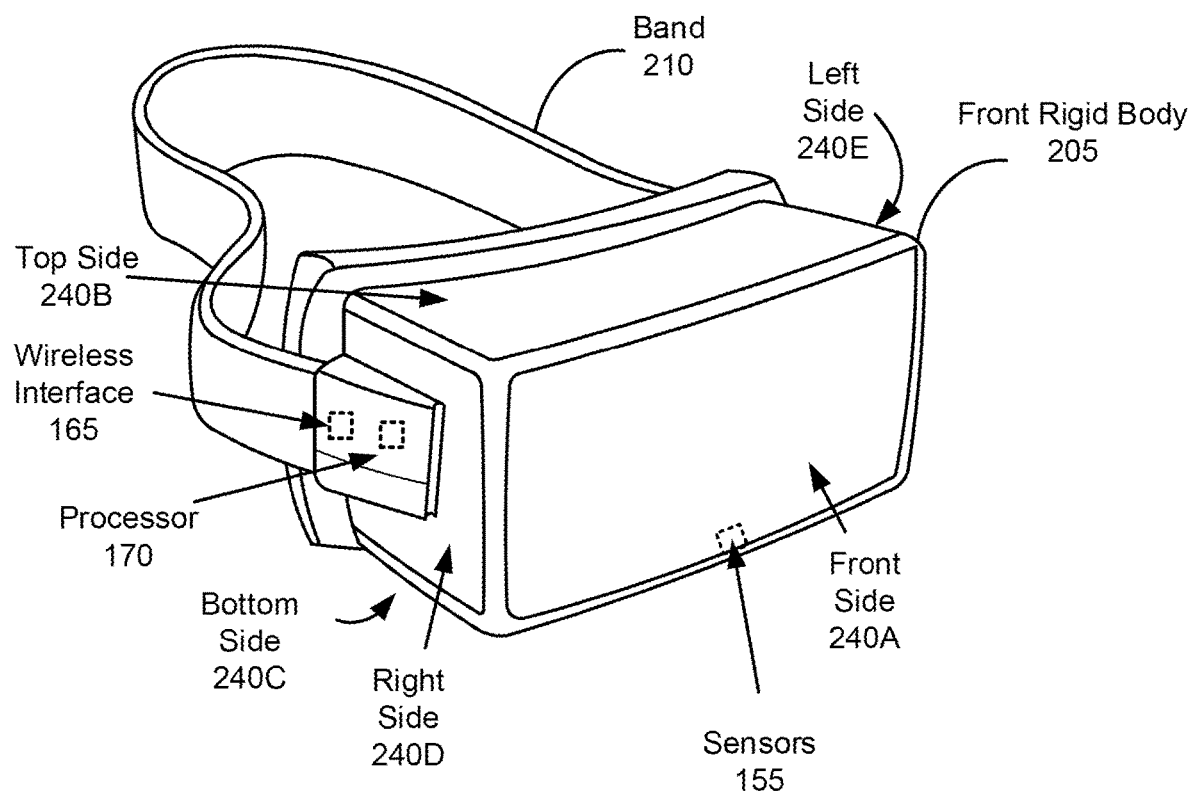
FIG. 2 is a diagram of a head wearable display, according to an example implementation of the present disclosure.

FIG. 2 is a diagram of a HWD 150, in accordance with an example embodiment. In some embodiments, the HWD 150 includes a front rigid body 205, a left side 240E, a front side 240A, a right side 240D, a bottom side 240C, a top side 240B, and a band 210. The front rigid body 205 includes the electronic display 175 (not shown in FIG. 2), the lens 180 (not shown in FIG. 2), the sensors 155, the eye trackers 160A, 160B, (not shown) the communication interface (wireless interface) 165, and the processor (image renderer) 170. In the embodiment shown by FIG. 2, the communication interface 165, the image renderer 170, and the sensors 155 are located within the front rigid body 205, and may not visible to the user. In other embodiments, the HWD 150 has a different configuration than shown in FIG. 2. For example, the communication interface 165, the image renderer 170, the eye trackers 160A, 160B, and/or the sensors 155 may be in different locations than shown in FIG. 2.

Figure 3:
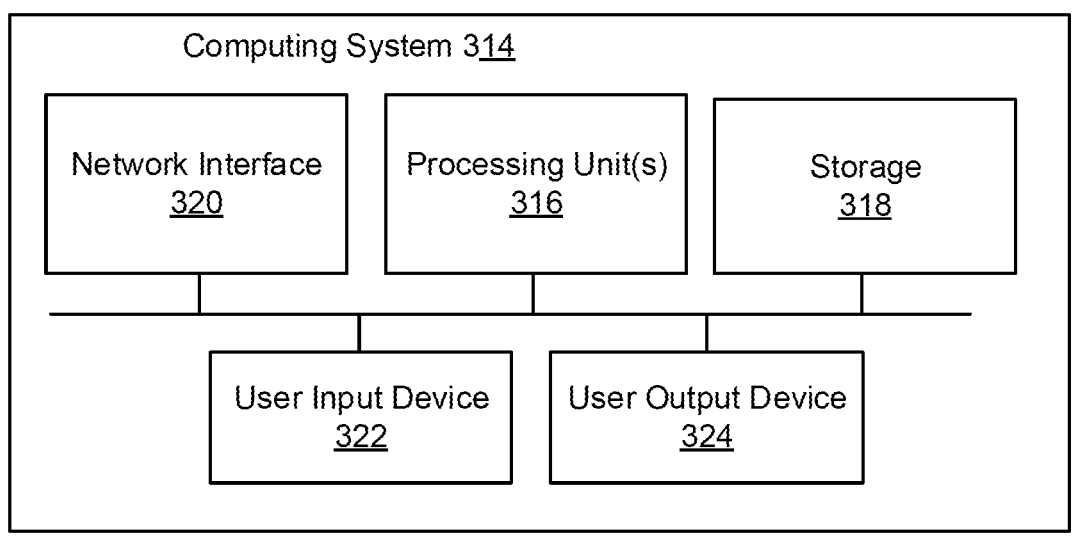
FIG. 3 is a block diagram of a computing environment, according to an example implementation of the present disclosure.

Various operations described herein can be implemented on computer systems. FIG. 3 shows a block diagram of a representative computing system 314 usable to implement the present disclosure, in accordance with an example embodiment. In some embodiments, the console 110, the HWD 150 or both of FIG. 1 are implemented by the computing system 314. Computing system 314 can be implemented, for example, as a consumer device such as a smartphone, other mobile phone, tablet computer, wearable computing device (e.g., smart watch, eyeglasses, head wearable display), desktop computer, laptop computer, or implemented with distributed computing devices. The computing system 314 can be implemented to provide VR, AR, MR experience. In some embodiments, the computing system 314 can include conventional computer components such as processors 316, storage device 318, network interface 320, user input device 322, and user output device 324.

Network interface 320 can provide a connection to a wide area network (e.g., the Internet) to which WAN interface of a remote server system is also connected. Network interface 320 can include a wired interface (e.g., Ethernet) and/or a wireless interface implementing various RF data communication standards such as Wi-Fi, Bluetooth, or cellular data network standards (e.g., 3G, 4G, 5G, 60 GHz, LTE, etc.).

User input device 322 can include any device (or devices) via which a user can provide signals to computing system 314; computing system 314 can interpret the signals as indicative of particular user requests for information. User input device 322 can include any or all of a keyboard, touch pad, touch screen, mouse or other pointing device, scroll wheel, click wheel, dial, button, switch, keypad, microphone, sensors (e.g., a motion sensor, an eye tracking sensor, etc.), and so on.

User output device 324 can include any device via which computing system 314 can provide information to a user. For example, user output device 324 can include a display to display images generated by or delivered to computing system 314. The display can incorporate various image generation technologies, e.g., a liquid crystal display (LCD), light-emitting diode (LED) including organic light-emitting diodes (OLED), projection system, cathode ray tube (CRT), or the like, together with supporting electronics (e.g., digital-to-analog or analog-to-digital converters, signal processors, or the like). A device such as a touchscreen that function as both input and output device can be used. Output devices 324 can be provided in addition to or instead of a display. Examples include indicator lights, speakers, tactile "display" devices, printers, and so on.

Some implementations include electronic components, such as microprocessors, storage and memory that store computer program instructions in a computer readable storage medium (e.g., non-transitory computer readable medium). Many of the features described in this specification can be implemented as processes that are specified as a set of program instructions encoded on a computer readable storage medium. When these program instructions are executed by one or more processors, they cause the processors to perform various operation indicated in the program instructions. Examples of program instructions or computer code include machine code, such as is produced by a compiler, and files including higher-level code that are executed by a computer, an electronic component, or a microprocessor using an interpreter. Through suitable programming, processor 316 can provide various functionality for computing system 314, including any of the functionality described herein as being performed by a server or client, or other functionality associated with message management services.

It will be appreciated that computing system 314 is illustrative and that variations and modifications are possible. Computer systems used in connection with the present disclosure can have other capabilities not specifically described here. Further, while computing system 314 is described with reference to particular blocks, it is to be understood that these blocks are defined for convenience of description and are not intended to imply a particular physical arrangement of component parts. For instance, different blocks can be located in the same facility, in the same server rack, or on the same motherboard. Further, the blocks need not correspond to physically distinct components. Blocks can be configured to perform various operations, e.g., by programming a processor or providing appropriate control circuitry, and various blocks might or might not be reconfigurable depending on how the initial configuration is obtained. Implementations of the present disclosure can be realized in a variety of apparatus including electronic devices implemented using any combination of circuitry and software.

In some implementations, devices may communicate using allocated channel transmission bandwidth such that only admitted (e.g., registered, assigned, member) devices have access to the channel (e.g., during a particular SP, during a particular schedule). Devices may request membership in a schedule to access the channel based on a broadcasted shared schedule and/or negotiate membership in the SP using a handshaking process. As part of the handshaking process, the devices may communicate characteristics (e.g., QoS characteristics) of their expected traffic flow using TSPEC elements.

A device (such as a STA or AP) may classify/identify each of the traffic streams according to source/destination address/identification and/or on a per TID basis during a setup negotiation process, for instance. A TID may comprise an identifier to identify a traffic stream. Traffic identified as latency sensitive (e.g., having a defined latency requirement, for instance to be within a specific latency range or below a defined latency threshold) may be prioritized. Member devices (e.g., devices registered/assigned to a SP) may prioritize their transmission of latency sensitive traffic (associated with TIDs specified during the setup negotiation process) by communicating their latency sensitive traffic during their assigned SP.

Figure 4:
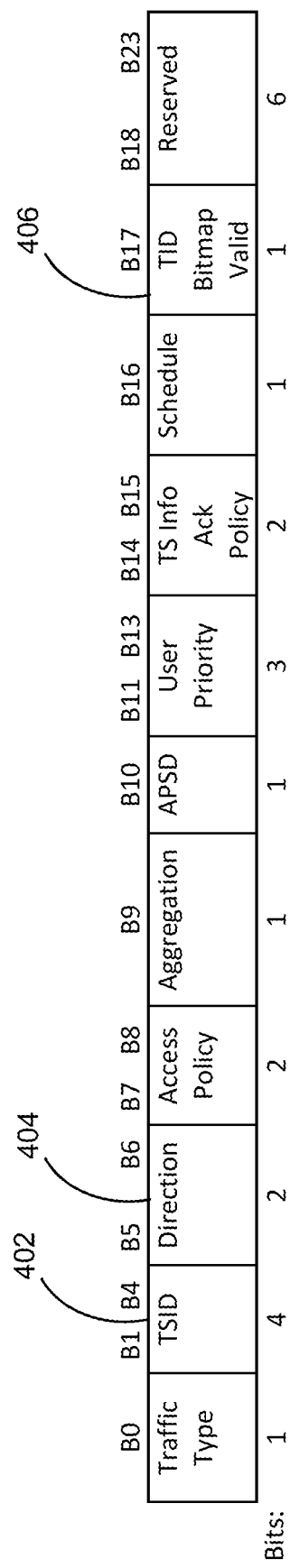
FIG. 4 is a format of a Traffic Stream Information Field in a TSPEC element, according to an example implementation of the present disclosure.

FIG. 4 is a format of a traffic stream (TS) Information (Info) Field in a TSPEC element, according to an example implementation of the present disclosure. In some configurations, one or more fields are established/configured/modified/added/appended and/or repurposed to enable the TSPEC element to identify a plurality of TIDs. It is contemplated that the locations (e.g., field, subfield, bitmap, octet and/or bit locations) and/or order of fields/bits in the TS Info Field may be altered and/or re-ordered from those illustrated herein.

The traffic stream identifier (TSID) 402 can indicate/identify a traffic stream in an expected flow of traffic. The direction 404 may indicate the direction of the traffic identified by TSID 402. For example, the direction 404 may indicate whether the traffic identified by TSID 402 is communicated in the uplink (UL) direction, downlink (DL) direction, bidirectional (e.g., both UL and DL), and/or whether the traffic is being sent directly (e.g., peer-to-peer traffic from one non-AP device to another non-AP device). The combination of the TSID 402 and direction 404 can indicate/represent/identify a single TID and the associated direction in a single TSPEC element.

As described herein, one way to express characteristics of multiple TIDs is to communicate multiple TSPEC elements. Additionally or alternatively, multiple TIDs may be identified using a single TSPEC element. The plurality of TIDs identified in the TSPEC element may share one or more characteristics (e.g., QoS characteristics). In some embodiments, one or more bits may be repurposed/modified/appended/set (e.g., set to a defined value such as '1') to indicate whether additional subfields/fields are valid. These additional subfields/fields may be used to identify a plurality of TIDs in a single TSPEC element. The single TSPEC element can be used to express characteristics (e.g., QoS characteristics) for the plurality of TIDs.

In some embodiments, a bit (or field) may be configured/repurposed/set in the TS Info Field 400 to indicate a validity of other subfields in the TSPEC element. For example, a TID Bitmap Valid Field 406 (or other specific field/bit) may be set (e.g., using a defined value such as '1') to indicate that a TID Bitmap subfield is valid (e.g., contains useful/relevant information such as a plurality of TIDs corresponding to a single TSPEC element). In one implementation, the TID Bitmap subfield 502 may be indicated in the extremely high throughput (EHT) Attributes field 500, described in FIG. 5. It should be appreciated that the TID Bitmap subfield 502 may be indicated in other fields/subfields/bit locations/information elements. For example, the TID Bitmap subfield may occur anywhere in the TSPEC element. Moreover, the position/location of the TID Bitmap subfield may be altered/reordered in the EHT Attributes field 500 (or other field/subfield/bit locations). If TID Bitmap valid field 406 is set (e.g., to the defined value), then one or more subfields (e.g., the TID Bitmap subfield 502 in FIG. 5) can contain/indicate useful/valid information regarding a plurality of TIDs. In some embodiments, the plurality of TIDs may be indicated because the TIDs share QoS characteristics and/or other traffic specification(s).

If the TID Bitmap field 406 is set (e.g., to the defined value), then a receiving device parsing the TS Info Field 400 may ignore the traffic indicated/identified in TSID 402. The TSID 402 may be invalid/ignored as being unrelated/inapplicable to the traffic specifications included/specified in the TS Info Field 400. It should be appreciated that while a plurality of TIDs may be indicated in certain subfields (e.g., the TID Bitmap subfield 502 in FIG. 5), the direction of the indicated plurality of TIDs may be extracted from the direction subfield 404 in the TS Info field 400.

If the bit/field is not set to the defined value (e.g., TID Bitmap valid 406 is not set), then one or more subfields (e.g., the TID Bitmap 502 in the EHT Attributes field 500 of FIG. 5) may contain padding or other non-useful information. Accordingly, if the bit/field (e.g., TID Bitmap Valid 406) is not set, then some subfields (e.g., the TID Bitmap 502 in the EHT Attributes field 500 of FIG. 5) may be ignored, and other subfields may contain relevant/valid information (e.g., TSID 402). That is, the receiving device may parse the TS Info Field 400 and determine characteristics of a particular TID indicated in TSID 402. The EHT Attributes field 500 is described in more detail in FIG. 5. It is contemplated that the locations (e.g., octet or bit locations) and/or order of these bit(s), field(s) and/or subfield(s) in an information element (IE) and/or TS Info Field format may be altered and/or re-ordered from those illustrated herein.

Figure 5:
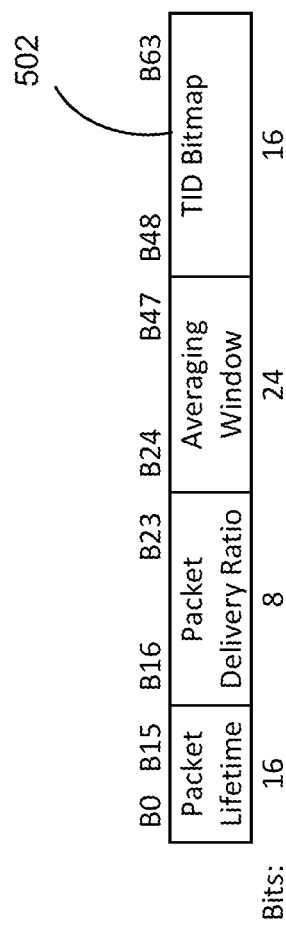
FIG. 5 shows an example of an extremely high throughput (EHT) Attributes field format, according to an example implementation of the present disclosure.

FIG. 5 shows an example of an EHT Attributes field format 500, according to an example implementation of the present disclosure. It is contemplated that the locations (e.g., field, subfield, bitmap, octet and/or bit locations) and/or order of bits indicated in the EHT Attributes field format 500 may be altered and/or re-ordered from those illustrated herein. The EHT Attributes field is an example field in which the TID Bitmap 502 may be expressed. As described herein, other fields/subfields/bit locations may be used to indicate the TID Bitmap. The TID Bitmap 502 may contain information related to a plurality of TIDs if a field (e.g., TID Bitmap Valid 406 in TS Info Field 400 in FIG. 4) is set. In some embodiments, the TID Bitmap may indicate TIDs sharing characteristics (e.g., QoS characteristics) specified by the TSPEC element.

The EHT Attributes Field 500 may be transmitted both ways/directions (e.g., from AP to STA and from STA to AP), and in some cases between STAs (e.g., in peer-to-peer communications or configuration). In some configurations, fields are established/configured/modified/added/appended and/or repurposed. For example, during negotiations between an AP and STA, one or more fields of the EHT Attributes Field 500 may be optionally established/configured/modified/added/appended and/or repurposed. In one implementation, a STA may modify/repurpose fields during negotiations with an AP in the EHT Attributes Field 500 and TS Info Field 400, enabling the TSPEC element for multiple TIDs. In response, the AP may append/configure/modify/add corresponding fields to the EHT Attributes Field 500, for confirming (or rejecting/modifying) the requested plurality of TIDs by the STA.

A TID Bitmap subfield 502 may be added/repurposed in the EHT Attributes Field 500. In some configurations, the TID Bitmap subfield 502 may be 2 octets (or other number of bits or octets, e.g., 8 or 14 bits) long. The TID Bitmap subfield 502 may indicate a plurality of TID(s) identified via a TSPEC element. In some embodiments, the TID Bitmap subfield 502 may indicate TIDs (identified by the scheduling AP or the scheduled STA) sharing QoS characteristics (or other characteristics).

The TIDs indicated in the TID Bitmap subfield 502 are associated with the single TSPEC element. In an example, the identified TIDs may share QoS characteristics or other characteristics. For example, a value of 1 (or 0) in bit position k in the bitmap may indicate that TID k is identified as sharing characteristics with another TID k+1 in position k+1. A value of 0 (or 1) in bit position k may indicate that TID k does not share the same characteristics as other TIDs that may be indicated. If a TID is not indicated/identified/selected/specified in the TID Bitmap subfield 502, then the TSPEC element may not define characteristics of (or may not apply to) that TID. The TID not indicated in the TID Bitmap subfield 502 may be defined/described in a different TSPEC element or in some cases, the TID (e.g., the TID and/or corresponding traffic stream's traffic specification) may not be defined at all.

As described herein, the TID Bitmap subfield (or some other equivalent subfield) may be located in any other field/subfield in the TSPEC element. For example, bits in other fields/subfields (e.g., not the EHT Attributes field 500) may be repurposed/modified/added for the TID Bitmap subfield 502.

In some situations, the STA or AP may not need to know specific TIDs identified in a TSPEC element. For example, there may be a situation when devices are transmitting traffic using P2P communication. That is, the direction 404 subfield may indicate that 'direct link' traffic is being communicated. In this example, the device receiving the TSPEC element may parse the TS Info field 400 and other fields, and may extract characteristics of the traffic/link without tying the characteristics to TIDs. In an example, a device such as an AP may extract characteristics (such as QoS characteristics) and not the associated one or more TIDs from the TID Bitmap subfield in the TSPEC element (if any are indicated). In the example, the AP may not extract the TID(s) indicated in the TSPEC element because the device may have no use for the particular plurality of TIDs indicated (e.g., in the TID Bitmap subfield). The second device (e.g., a STA) may report to the device (e.g., the AP) a general indication of the presence of direct link traffic (e.g., P2P traffic) and the direct link traffic's associated traffic characteristics.

In an example implementation, an AP and a STA negotiating a restricted target wake time (rTWT) schedule may not need information regarding TIDs communicated in P2P traffic. However, the AP may still benefit from extracting the requested characteristics in the TSPEC element for such P2P traffic. Accordingly, during negotiation of a rTWT schedule, if the direction subfield 404 indicates that direct link traffic is being communicated, then the receiving device may ignore TSID 402, TID Bitmap Valid 406, and/or TID Bitmap 502 in FIG. 5.

Figure 6:
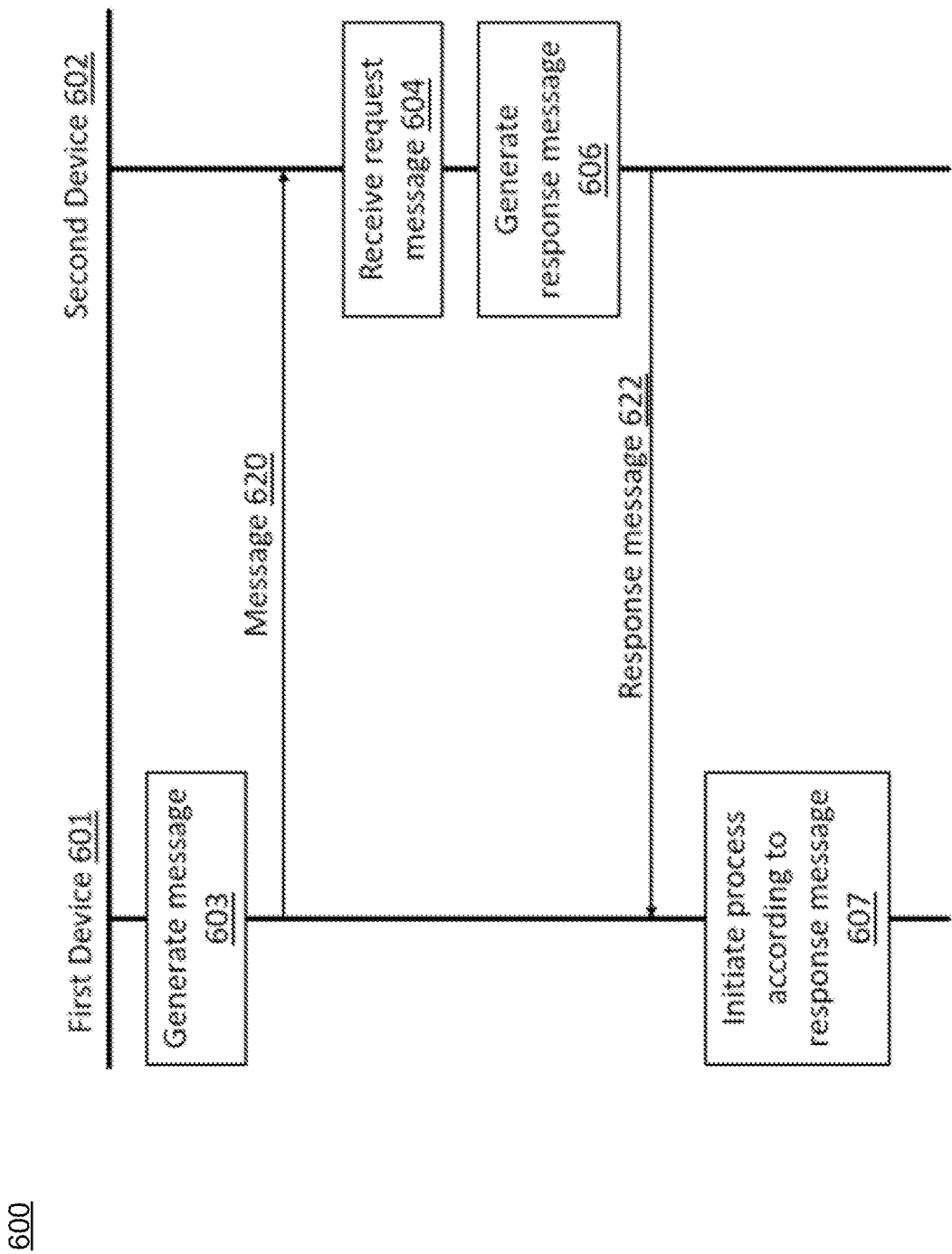
FIG. 6 is an interaction/flow diagram showing a process of indicating one or more TIDs in a single TSPEC element, according to an example implementation of the present disclosure.

FIG. 6 illustrates an interaction/flow diagram showing a process 600 of indicating one or more TIDs in a single TSPEC element, according to an example implementation of the present disclosure. In some embodiments, the process 600 is performed by a first device 601 and a second device 602. The first device 601 and the second device 602 may be some combination of an AP (e.g., AP 105), a soft AP, and/or a station (e.g., computing device 110). In some embodiments, the process 600 is performed by other entities. In some embodiments, the process 600 includes more, fewer, or different steps than shown in FIG. 6.

In more details of operation 603, the first device 601 may configure fields in a message, indicating a group/bundle/plurality of TIDs (representing/identifying traffic streams). As described herein, the first device 601 may indicate such TIDs because the TIDs may share QoS characteristics. For example, the first device 601 may request the communication of multiple traffic streams in a particular SP. Alternatively, the first device 601 may accept/approve (or modify/reject) a request (e.g., from a second device 602) of a plurality of TIDs. A field or subfield (e.g., a first field) in the message may (when set to a defined value) indicate the plurality of TIDs identified in the TSPEC element. Specifically, the field may indicate whether one or more subfields in a second field are valid. The field may include a valid bit indication corresponding to one or more subfields containing valid/invalid information. For example, with reference to FIG. 4, the TID Bitmap Valid 406 in the TS Info Field 400 may be set (to the defined value), indicating the multiple TIDs in the TSPEC element. These TIDs may be identified (or grouped/bundled in a single TSPEC element) because they share QoS characteristics (or other characteristics). In other words, if the valid bit indicator is set (e.g., TID Bitmap Valid 406 in FIG. 4), then a corresponding subfield (e.g., TID Bitmap 502 in FIG. 5) may contain valid information. Further, if the TID Bitmap Valid 406 in the TS Info Field 400 is set, then the first device 601 may be conveying that the second device 602 should ignore any bits in the TSID subfield 402 in the TS Info field 400 of the TSPEC element (e.g., should not relate/apply the TSID subfield 402 to the traffic specification described/indicated in the TS Info field 400 or TSPEC element).

Another field, (e.g., the second field) in the message may indicate/include a bitmap conveying a plurality of TIDs sharing a TSPEC element. The second field may express/identify (or correspond to) TIDs using the TSPEC element. The TIDs may be expressed/indicated/identified because they share QoS characteristics (or other characteristics). As described with reference to FIG. 5, a TID Bitmap 502 may be added/repurposed to the EHT Attributes field 500 (or other field in the TSPEC element). The TID Bitmap 502 may a plurality of TIDs in the single TSPEC element. The TIDs may share QoS characteristics and/or other traffic specification(s).

Another subfield (direction subfield) in the first field in the message may indicate a direction of one TID (e.g., the TID indicated in TSID 402 in the TS Info Field 400 of FIG. 4) and/or multiple TIDs (e.g., the TIDs indicated in TID Bitmap 502 in EHT Attributes field 500 of FIG. 5). The direction subfield may indicate the direction of one TID if the first field is not set to the defined value (e.g., TID Bitmap Valid 406 is not set). The direction subfield may indicate the direction of multiple TIDs if the first field is set to the defined value (e.g., TID Bitmap Valid 406 is set). The direction subfield (e.g., direction 404 in the TS Info Field 400 of FIG. 4) may indicate a traffic flow in the UL direction, a traffic flow in the DL direction, a bidirectional traffic flow, or a traffic flow in a direction. The direction of traffic may be indicated for a particular SP. This direction subfield may cause the second device 602 to ignore the plurality of TIDs indicated in the TID Bitmap 502 of FIG. 5 if this direction subfield indicates that direct link traffic is being communicated (e.g., the first device 601 and a third device (not shown) intends to communicate using P2P communication). In a particular example, the second device 602 may ignore the plurality of TIDs indicated in the TID bitmap 502 if the P2P communication is in a SP of a rTWT.

In more details of operation 620, the first device 601 may transmit the message to the second device 602. For example, the first device 601 may transmit the message as part of a handshake process.

In more details of operation 604, the second device 602 may receive the message transmitted by the first device 601. The second device 602 may extract information from the message. In operation 606, the second device 602 may generate a response message in response to the information extracted from the received message in operation 620. In some embodiments, the response message may be similar to the message (e.g., structurally, operationally). For example, in some embodiments, an AP (e.g., second device 602) may generate a response message in response to the message, approving the STA (e.g., first device 601) to transmit the plurality of TIDs during a particular SP. The AP may approve the message by generating a response message that is similar to the message (e.g., copies the message with the configured subfield(s), matches the message with the configured subfield(s)). In an example, if the second device 602 is an AP, the second device 602 may schedule downlink traffic (or peer-to-peer traffic) to be transmitted from the first device 601 (e.g., a STA). In some embodiments, if TIDs are indicated as sharing QoS characteristics (or other characteristics), the second device 602 may schedule downlink traffic (or P2P traffic) using (or according to) the QoS characteristics (or traffic specification). In another example, if the second device 602 is a STA, the second device 602 may schedule uplink traffic (or peer-to-peer traffic) to be transmitted from the first device 601 (e.g., an AP, a different STA). In some embodiments, if TIDs are indicated as sharing QoS characteristics (or other characteristics), the second device 602 may schedule uplink traffic (or P2P traffic) using the QoS characteristics (or traffic specification).

In other embodiments, the response message generated in operation 606 may be different from the message (e.g., structurally, operationally). If the response message does not match the message received by the second device 602, the second device 602 may be rejecting the plurality of TIDs in a particular SP, suggesting alternate traffic streams to be bundled/grouped in the particular SP (or a different SP), and/or modifying one or more other parameters in TSPEC element (e.g., time allocated, SP interval, QoS characteristics, etc.).

The response message may partially reject (or modify/suggest) one or more parameters of the message generated in operation 603. For example, the second device 602 may reject one or more characteristics/parameters requested in the message 620. Specifically, the second device 602 may reject a requested SP interval. The response message may also wholly reject (or modify) the message generated in operation 603. For example, the SP requested to communicate the plurality of TIDs may be full (e.g., and cannot accept/include/schedule an additional traffic stream). In this case, the second device 602 may suggest an alternate schedule for the first device 601 to communicate the plurality of TIDs. Accordingly, the response message would reject the message generated in operation 603 and suggest an alternate schedule.

In more details of operation 622, the second device 602 may transmit the response message to the first device 601. In more details of operation 607, the first device 601 may receive, from the second device 602, the response message. The response message may be received in response (in part) to the message communicated to the second device 602 in operation 620. The first device 601 may extract information from the response message. For example, the first device 601 may compare one or more portions of the response message to the message generated in operation 603 to determine whether the plurality of TIDs requested for a particular SP are partially/completely approved, rejected, and/or modified. If the response message matches the message, then the first device 601 may determine that the plurality of TIDs are approved for transmission during the SP. Moreover, the first device 601 may determine that the first device 601 and the second device 602 have agreed to one or more other parameters that may have been present in the message generated at 603 (e.g., time allocated/SP interval, QoS characteristics).

If the response message partially matches, then the first device 601 may determine that the portions of the response message matching the message indicate approval. For example, a portion of the response message that partially matches may indicate that the plurality of TIDs requested to be communicated during a particular SP are approved for transmission during the SP. The portions of the response message that do not match may indicate a disagreement (e.g., a rejection, modification, and/or suggestion of one or more parameters). For example, a portion of the response message that does not match may indicate a suggested SP interval.

Referring back to operation 607, the first device 601 may initiate a process according to the response message. For example, the first device 601 may schedule the plurality of TIDs (e.g., approved/accepted by the second device 602 in the request message), to time slots, and may communicate these traffic streams. Communicating the traffic may include/encompass transmitting the traffic streams using slot(s), time duration(s), medium access mechanisms, symbols, carrier(s), and the like. Additionally or alternatively, the first device 601 may prepare a subsequent message to be transmitted to the second device 602 approving/rejecting/modifying one or more portions of the response message received by the first device 601.

Having now described some illustrative implementations, it is apparent that the foregoing is illustrative and not limiting, having been presented by way of example. In particular, although many of the examples presented herein involve specific combinations of method acts or system elements, those acts and those elements can be combined in other ways to accomplish the same objectives. Acts, elements and features discussed in connection with one implementation are not intended to be excluded from a similar role in other implementations or implementations.

The hardware and data processing components used to implement the various processes, operations, illustrative logics, logical blocks, modules and circuits described in connection with the embodiments disclosed herein may be implemented or performed with a general purpose single- or multi-chip processor, a digital signal processor (DSP), an application specific integrated circuit (ASIC), a field programmable gate array (FPGA), or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, such as a combination of a DSP and a microprocessor, a plurality of microprocessors, one or more microprocessors in conjunction with a DSP core, or any other such configuration. In some embodiments, particular processes and methods may be performed by circuitry that is specific to a given function. The memory (e.g., memory, memory unit, storage device, etc.) may include one or more devices (e.g., RAM, ROM, Flash memory, hard disk storage, etc.) for storing data and/or computer code for completing or facilitating the various processes, layers and modules described in the present disclosure. The memory may be or include volatile memory or non-volatile memory, and may include database components, object code components, script components, or any other type of information structure for supporting the various activities and information structures described in the present disclosure. According to an exemplary embodiment, the memory is communicably connected to the processor via a processing circuit and includes computer code for executing (e.g., by the processing circuit and/or the processor) the one or more processes described herein.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

The phraseology and terminology used herein is for the purpose of description and should not be regarded as limiting. The use of "including" "comprising" "having" "containing" "involving" "characterized by" "characterized in that" and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular can also embrace implementations including a plurality of these elements, and any references in plural to any implementation or element or act herein can also embrace implementations including only a single element. References in the singular or plural form are not intended to limit the presently disclosed systems or methods, their components, acts, or elements to single or plural configurations. References to any act or element being based on any information, act or element can include implementations where the act or element is based at least in part on any information, act, or element.

Any implementation disclosed herein can be combined with any other implementation or embodiment, and references to "an implementation," "some implementations," "one implementation" or the like are not necessarily mutually exclusive and are intended to indicate that a particular feature, structure, or characteristic described in connection with the implementation can be included in at least one implementation or embodiment. Such terms as used herein are not necessarily all referring to the same implementation. Any implementation can be combined with any other implementation, inclusively or exclusively, in any manner consistent with the aspects and implementations disclosed herein.

Where technical features in the drawings, detailed description or any claim are followed by reference signs, the reference signs have been included to increase the intelligibility of the drawings, detailed description, and claims. Accordingly, neither the reference signs nor their absence have any limiting effect on the scope of any claim elements.

Systems and methods described herein may be embodied in other specific forms without departing from the characteristics thereof. References to "approximately," "about" "substantially" or other terms of degree include variations of +/−10% from the given measurement, unit, or range unless explicitly indicated otherwise. Coupled elements can be electrically, mechanically, or physically coupled with one another directly or with intervening elements. Scope of the systems and methods described herein is thus indicated by the appended claims, rather than the foregoing description, and changes that come within the meaning and range of equivalency of the claims are embraced therein.

The term "coupled" and variations thereof includes the joining of two members directly or indirectly to one another. Such joining may be stationary (e.g., permanent or fixed) or moveable (e.g., removable or releasable). Such joining may be achieved with the two members coupled directly with or to each other, with the two members coupled with each other using a separate intervening member and any additional intermediate members coupled with one another, or with the two members coupled with each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

References to "or" can be construed as inclusive so that any terms described using "or" can indicate any of a single, more than one, and all of the described terms. A reference to "at least one of 'A' and 'B'" can include only 'A', only 'B', as well as both 'A' and 'B'. Such references used in conjunction with "comprising" or other open terminology can include additional items.

Modifications of described elements and acts such as variations in sizes, dimensions, structures, shapes and proportions of the various elements, values of parameters, mounting arrangements, use of materials, colors, orientations can occur without materially departing from the teachings and advantages of the subject matter disclosed herein. For example, elements shown as integrally formed can be constructed of multiple parts or elements, the position of elements can be reversed or otherwise varied, and the nature or number of discrete elements or positions can be altered or varied. Other substitutions, modifications, changes and omissions can also be made in the design, operating conditions and arrangement of the disclosed elements and operations without departing from the scope of the present disclosure.

References herein to the positions of elements (e.g., "top," "bottom," "above," "below") are merely used to describe the orientation of various elements in the FIGURES. The orientation of various elements may differ according to other exemplary embodiments, and that such variations are intended to be encompassed by the present disclosure.

The invention claimed is:

1. A method comprising:
    configuring, by a first wireless communication device, a traffic specification (TSPEC) element including a plurality of quality of service (QOS) attributes, a field indicating a presence or absence of a bitmap, and the bitmap which indicates at least some of a plurality of traffic identifiers (TIDs) sharing the QoS attributes included in the TSPEC element; and
    sending, by the first wireless communication device, a message to a second wireless communication device, the message comprising the TSPEC element including the bitmap, the message including the field set to a predefined value to indicate that the bitmap contains valid information.

2. The method of claim 1, wherein the field being set to the predefined value, causes the second wireless communication device to ignore a traffic stream identifier associated with the TSPEC element.

3. The method of claim 1, wherein the message includes a direction subfield that indicates a direction of the plurality of TIDs.

4. The method of claim 3, wherein the direction subfield indicates one of: sending traffic in an uplink direction, sending traffic in a downlink direction, sending bidirectional traffic, or sending direct link traffic.

5. The method of claim 4, comprising:
    causing the second wireless communication device to ignore the plurality of TIDs when the direction subfield indicates sending direct link traffic, and the direct link traffic is to be sent during a service period of a restricted target wake time.

6. The method of claim 1, wherein the second wireless communication device comprises an access point or a station device.

7. The method of claim 1, wherein the TSPEC element includes characteristics that are shared by the plurality of TIDs.

8. A first wireless communication device comprising:
    at least one processor configured to configure traffic specification (TSPEC) element including a plurality of quality of service (QOS) attributes, a field indicating a presence or absence of a bitmap, and the bitmap which indicates at least some of a plurality of traffic identifiers (TIDs) sharing QoS attributes included in the TSPEC element; and
    a transmitter configured to send a message comprising the TSPEC element including the bitmap to a second wireless communication device, the message including the field set to a predefined value to indicate that the bitmap contains valid information.

9. The first wireless communication device of claim 8, wherein the field being set to the predefined value, causes the second wireless communication device to ignore a traffic stream identifier associated with the TSPEC element.

10. The first wireless communication device of claim 8, wherein the message includes a direction subfield that indicates a direction of the plurality of TIDs, wherein the direction subfield indicates one of: sending traffic in an uplink direction, sending traffic in a downlink direction, sending bidirectional traffic, or sending direct link traffic.

11. The first wireless communication device of claim 10, wherein the direction subfield is configured to cause the second wireless communication device to ignore the plurality of TIDs when the direction subfield indicates sending direct link traffic, and the direct link traffic is to be sent during a service period of a restricted target wake time.

12. A method comprising:
    receiving, by a second wireless communication device from a first wireless communication device, a message comprising a traffic specification (TSPEC) element including a plurality of quality of service (QOS) attributes, a field indicating a presence or absence of a bitmap, and the bitmap, wherein the field is set to a predefined value to indicate that the bitmap contains valid information,
    wherein the bitmap indicates at least some of a plurality of traffic identifiers (TIDs) sharing QoS attributes included in the TSPEC element.

13. The method of claim 12, comprising:
    determining, by the second wireless communication device, to ignore a traffic stream identifier associated with the TSPEC element, when the field is set to the predefined value.

14. The method of claim 12, wherein the message includes a direction subfield that indicates a direction of the plurality of TIDs.

15. The method of claim 14, wherein the direction subfield indicates one of: sending traffic in an uplink direction, sending traffic in a downlink direction, sending bidirectional traffic, or sending direct link traffic.

16. The method of claim 15, comprising:
    determining, by the second wireless communication device, to ignore the plurality of TIDs, when the direction subfield indicates sending direct link traffic, and the direct link traffic is to be sent during a service period of a restricted target wake time.

17. A second wireless communication device, comprising a receiver and at least one processor configured to implement the method of claim 12.

* * * * *